Oct. 28, 1924.
W. R. BARRETT
FABRIC CUTTER
Filed Feb. 9, 1923
1,513,688
4 Sheets-Sheet 3
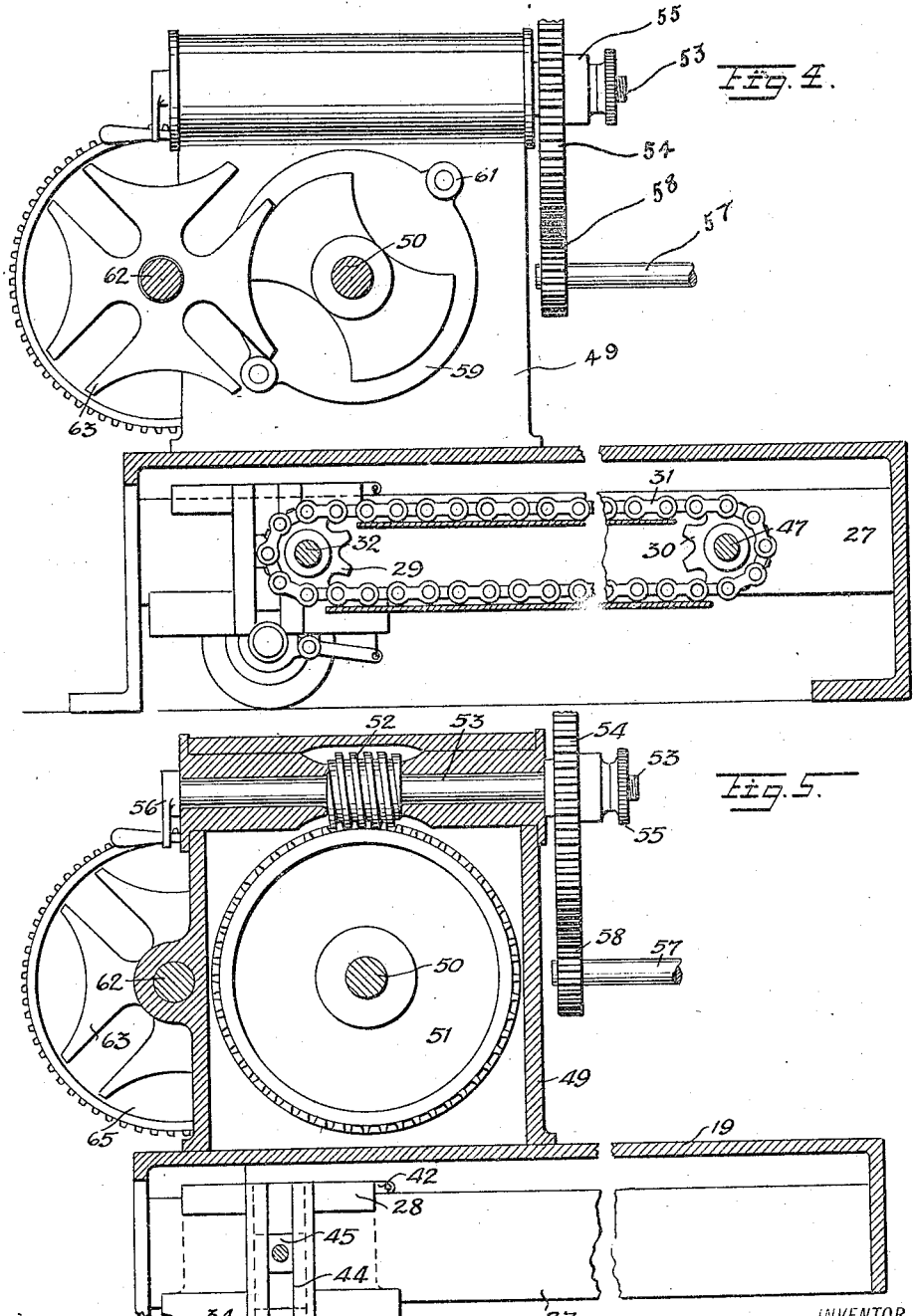

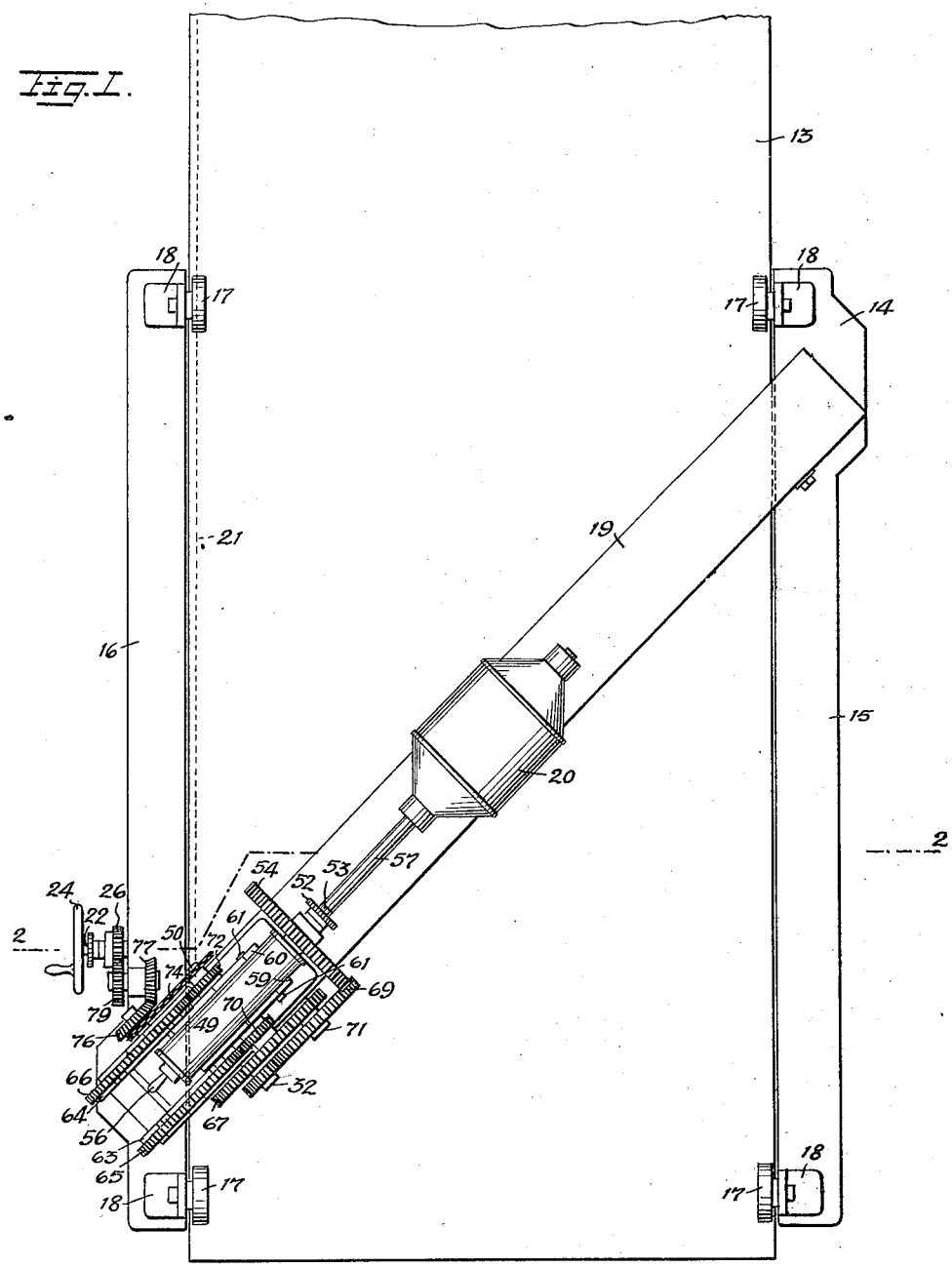

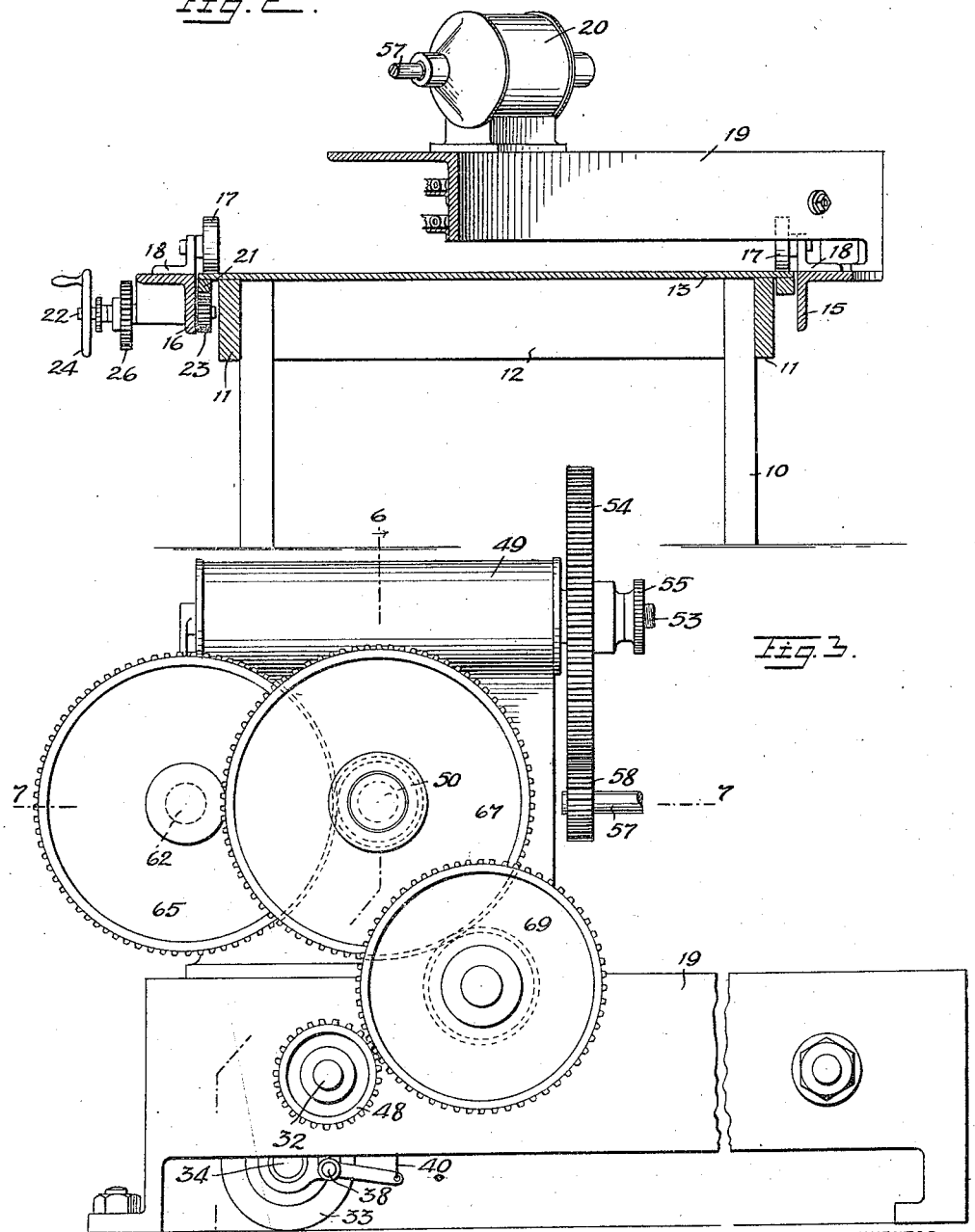

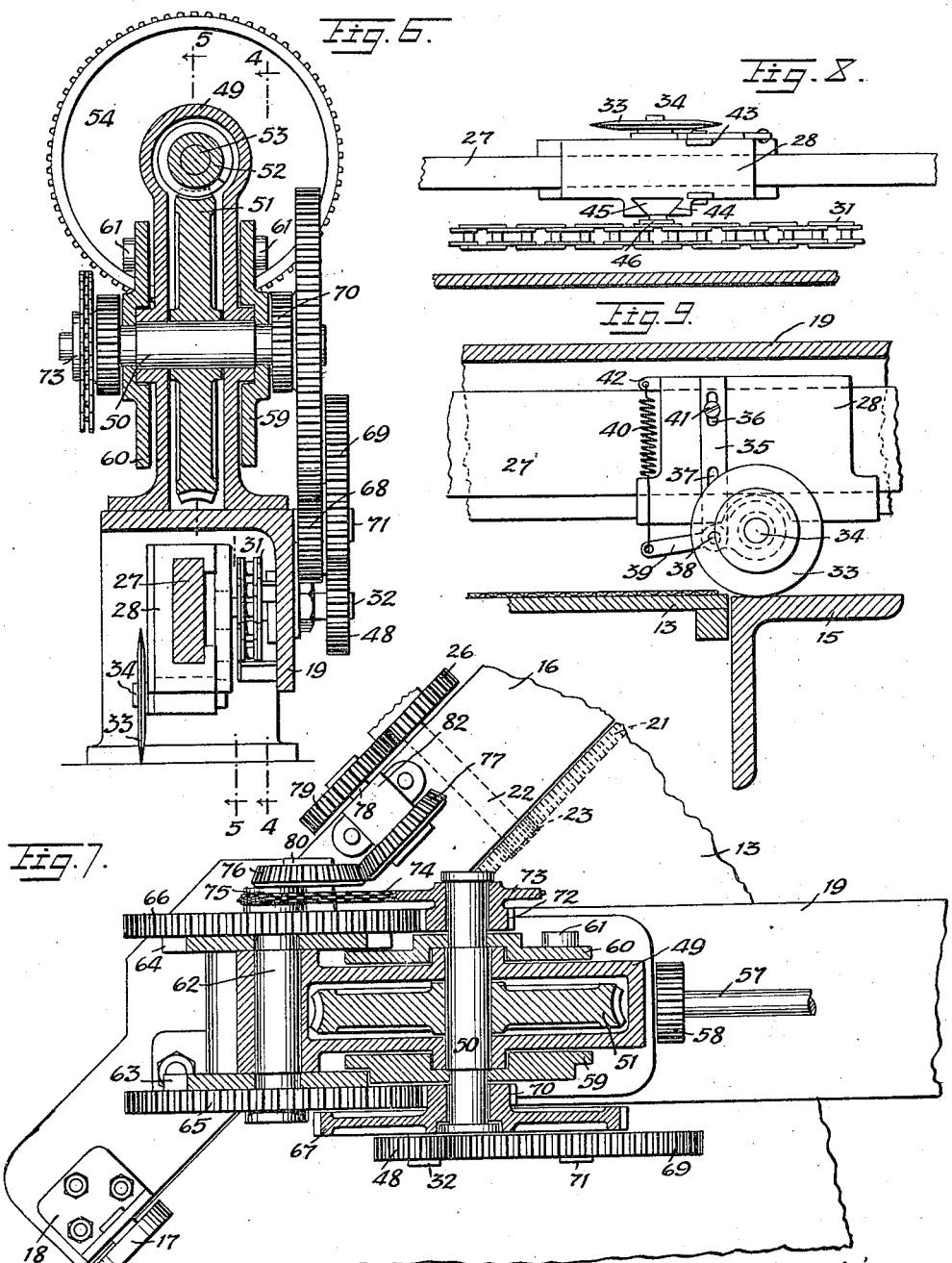

Patented Oct. 28, 1924.

1,513,688

UNITED STATES PATENT OFFICE.

WILLIAM R. BARRETT, OF NEW YORK, N. Y.

FABRIC CUTTER.

Application filed February 9, 1923. Serial No. 618,058.

*To all whom it may concern:*

Be it known that I, WILLIAM R. BARRETT, a citizen of the United States, and a resident of the city of New York, borough of Manhattan, in the county and State of New York, have invented new and useful Improvements in Fabric Cutters, of which the following is a full, clear, and exact description.

This invention relates to fabric cutters and was primarily designed for cutting fabrics used in the manufacture of various kinds of rubber goods.

A number of different types of fabric cutters have been in use for years with varying degrees of success. Some of these fabric cutters are very complicated, expensive and difficult to operate. Another objection to known types of fabric cutters is the space they require for housing.

The general object of this invention is the provision of a cheap, simple and efficient fabric cutter having means for automatically setting the cutting member in operation and for automatically shifting the cutting member after each cutting stroke.

A further object of the invention is the provision of a fabric cutter having a fabric support made from a material of a certain hardness, and a cutting member which operates on said fabric support made from a material having a different degree of hardness.

These objects are accomplished by providing a fabric support in the form of a table, mounting on said fabric support a carriage carrying a disk cutter made from a material harder than the fabric support and mounted for movement backward and forward across the fabric support, associating with the cutter means for operating it, providing in conjunction with the fabric support and carriage means for shifting the carriage relative to the fabric support, and supplying means for alternately setting the means for operating the cutter and the means for shifting the carriage in motion.

These and other objects of the invention will be more clearly understood from the following detailed description and accompanying drawings.

Figure 1 is a top plan view of the fabric cutter;

Figure 2 is a vertical section along the line 2—2, Figure 1;

Figure 3 is a side elevation of a portion of the fabric cutter showing a train of gears for operating the cutting member;

Figure 4 is a vertical section along the line 4—4, Figure 6, showing constructional detail;

Figure 5 is a vertical section along the line 5—5, Figure 6, showing constructional features;

Figure 6 is a transverse vertical section along the line 6—6, Figure 3.

Figure 7 is a horizontal section on the line 7—7, Figure 3, showing the construction of the device;

Figure 8 is a top plan view of the cutting member and the means for operating it;

Figure 9 is a side elevation of the cutting member, showing its mounting.

Referring to the above-mentioned drawings, the invention includes a fabric support 13 mounted on a frame including legs 10 and side and end members 11 and 12. A carriage 14, including two side members 15 and 16 the shape of angle irons extending longitudinally of the fabric support 13 and located adjacent the sides of the fabric support, is movably mounted on the fabric support by means of wheels 17 carrying depending hangers 18 attached to the side members 15 and 16. A casing 19 extends diagonally across the fabric support 13 and has its ends connected to the side members 15 and 16. Mounted on the casing 19 is a motor 20. In mounting the side members 15 and 16 their tops are located approximately in the same plane as the top of the fabric support 13.

In order to move the carriage 14 relative to the fabric support 13, a rack 21 is attached to the lower face of the fabric support adjacent the side member 16. A shaft 22 is rotatably mounted in the side member 16 and carries a pinion 23 which meshes with the rack 21. When it is desired to shift the carriage manually a crank wheel 24 is fixed to the shaft 22. In order to provide for a power drive for shifting the carriage a pinion 26 is mounted on the shaft 22 outside of the side member 16.

Mounted in the casing 19 and extending lengthwise of it is a guide 27 having a slide 28 movably mounted thereon. A plate 35 having slots 36 and 37 is slidably mounted on the slide 28 by means of screws 41. A lever 39 is rotatably mounted on an axle 38 carried by the plate 35. A disk cutter 33 is rotatably mounted on an axle 34 fixed to an enlargement formed on the end of the lever 39. This cutter is pressed into engagement with the fabric support 13 by means of a spring 40 which connects one end of the lever 39 to an arm 42 fixed to the slide 28. In order to rigidly mount the plate 35, a vertical groove 43 is formed in the side of the slide 28 for receiving the plate, as shown in Figure 8.

In the opposite side of the slide 28 from the plate 35 a groove 44 is formed in which a block 45 is slidably mounted. This block 45 is rigidly connected to a chain 31 at 46. The chain 31 is carried by sprocket wheels 29 and 30 located at opposite ends of the casing 19. An axle 47 carries the sprocket wheel 30 while a shaft 32 carries the sprocket wheel 29. This shaft 32 extends beyond the casing 19 and has a pinion 48 mounted on its outer end.

Located on the casing 19 is a housing 49 in which a shaft 50 is journaled. Fixed to the shaft 50 and located in the housing is a worm wheel 51 meshing with a worm 52 carried by a shaft 53 rotatably mounted in the upper portion of the housing 49. On the outer end of the shaft 53 a gear 54 is rotatably mounted, and a thumb nut 55 is provided for fixing the gear 54 to the shaft 53. Mounted on the opposite end of the shaft 53 is a crank 56 for manually operating the shaft 53. A pinion 58 fixed on the motor shaft 57 meshes with the gear 54, providing means for operating the gear 54 by the motor 20. Fixed to both ends of the shaft 50 are cam plates 59 and 60 of Geneva movements. Each cam plate has two pins 61 mounted thereon near its periphery and these pins are spaced 180° from one another. In mounting the cam plates, one plate is so positioned that its pins are located 90° from corresponding pins on the other plate. An axle 62 is fixed in the end of the housing 49 and has loosely mounted on its ends cross elements 63, 64 of Geneva movements. Fixed to the cross elements 63 and 64 of Geneva movements are gears 65 and 66, respectively, which serve to transmit motion from the former. Loosely mounted on one end of the shaft 50 is a pinion 70 formed integral with a gear 67 and meshing with the gear 65. Rotatably mounted on an axle 71 fixed to the casing 19 is a pinion 68 having fixed thereto a gear 69. The pinion 68 meshes with the gear 67 and the gear 69 meshes with the pinion 48. Thus means has been provided for transmitting motion from the shaft 50 to the shaft 32.

Loosely mounted on the other end of the shaft 50 is a pinion 72 and a sprocket wheel 73, rigidly connected together, the pinion 72 meshing with the gear 66. Loosely mounted on an axle 80 is a bevel gear 76 and a sprocket wheel 75, the two being connected. A chain 74 connects the sprocket wheel 73 to the sprocket wheel 75. Rotatably mounted in a bearing 82 carried by the casing 19 is a shaft 78 carrying a bevel gear 77 and a gear wheel 79 fixed to the opposite ends, the bevel gear 77 meshing with the bevel gear 76 rotatably mounted on the axle 80. The gear 79 meshes with the gear 26 fixed to the shaft 22.

The operation of this device is as follows:

The gear 54 is fixed to the shaft 53 by means of the thumb nut 55. The motor 20 is then set in operation and through the shaft 57, pinion 58, gear 54, shaft 53, worm 52, worm wheel 51 operates the shaft 50. The cam plates 59 and 60 rotate with the shaft 50 since they are fixed thereto. Referring to Figure 4, one of the pins 61 mounted on the plate 59 engages the cross element 63 and begins the rotation of it. One of the pins 61 mounted on the cam plate 60 moves out of engagement with the cross element 64 as the pin 61 on the cam plate 59 engages the cross element 63 since the corresponding pins on the cam plates 59 and 60 are spaced 90° apart. For each rotation of 180° of the cam plate 59 the cross element 63 is rotated through 90°. The motion of the cross element 63 is conveyed through gear 65, pinion 70, gear 67, pinion 68, gear 69, pinion 48 to the shaft 32. The rotation of the shaft 32 drives the sprocket wheel 29 operating the chain 31. As the chain 31 operates, the slide 28 is moved on the guide 27, carrying the cutter disk 33 across the fabric support 13. The train of gears mentioned above are so designed that upon the rotation of the cross element 63 through 90° the chain is given movement great enough to carry the cutter disk 33 from a position on one of the side members 15 or 16 to a position on the other. The movement gives one complete cutting stroke. After the cross element 63 has been rotated through 90° it becomes disengaged from the pin 61 and is not engaged again until the cam plate 59 has completed a rotation of 90°. As soon as the cross element 63 is released the chain 31 stops movement and a pin 61 on the cam plate 60 engages the cross element 64. As the cam plate 60 rotates, the cross element 64 is rotated through 90° for every rotation of 180° by the cam plate. As the cam plate 64 rotates it transmits its motion through gear 66, pinion 72, sprocket wheel 73, chain 74, sprocket wheel 75, bevel gear 76, bevel gear 77, shaft 78, gear 79, gear 26 to the shaft 22. As the shaft 22 rotates, the pin 23 is rotated moving it along the rack 21. Since the shaft 22 is rotatably mounted in the side member 16 the whole carriage 14 is moved longitudinally of the fabric support 13. The distance the carriage is moved will depend on the train of gears interposed between the cross element 64 and the shaft 22. By changing the gears, the distance through which the carriage will be moved can be altered at will. As it will be seen from the above, the movement of the carriage takes place when the cutter disk is positioned on one of the side members 15 or 16. This eliminates all danger of damaging the cutter disk through the movement of the carriage. After the carriage has been shifted through the desired distance one of the pins on the cam plate 59 again engages the cross element 63, setting the cutter disk in motion again. These operations continue automatically so that after each cutting stroke of the cutting disk 33 the carriage is shifted, positioning the cutter disk for a new cutting stroke.

In constructing the fabric support 13 it is necessary, in order to get a proper cutting, to make the fabric support of a material having a certain hardness, preferably a steel, and then to make the cutter disk 33 from a material, also a steel, having a greater degree of hardness. It has been found from experiment that this gives good results in cutting rubber goods. Further, the flat fabric support provided in this machine is necessary in working rubber goods since they are easily creased or spoiled by coming in contact with rollers.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In a fabric cutter of the character described including a prime mover, a cutter, means for operating the cutter, means for shifting the cutter after each cut, and means for alternately connecting the cutter operating means and shifting means to the prime mover.

2. A device of the character described, comprising a fabric supporting member, a carriage mounted on said fabric supporting member, a cutter carried by said carriage, said cutter being harder than the fabric support, means for operating said cutter, means for shifting the carriage carrying the cutter, and means for alternately setting the cutting operating means and the carriage shifting means in motion.

3. In a fabric cutter of the character described including a fabric support, a carriage mounted on said fabric support and a casing mounted on said carriage, a cutter comprising a cutting member slidably mounted in the casing, spring means for exerting a downward force on the connecting member, means for moving the cutting member longitudinally of the casing, and means for adjusting the cutting member so as to project it against the fabric support with any desired force.

4. A fabric cutter of the character described, comprising a fabric support, a carriage mounted on said fabric support, a casing located on the carriage and extending diagonally across the fabric support, a cutting member slidably mounted in the casing, means for operating the cutting member, carrying it back and forth across the fabric supporting member, means for shifting the carriage to shift the cutting member after each cut, and means for alternately setting the means for operating the cutting member and the means for shifting the carriage in motion.

5. A fabric cutter of the character described, comprising a fabric support, a carriage mounted on said fabric support, a cutting member movably mounted on said carriage means for operating the cutting member, carrying it back and forth across said fabric support, means for shifting the carriage to shift the cutting member at the end of each cutting stroke, and means for alternately setting the means for operating the cutting member and the means for shifting the carriage in operation.

6. A fabric cutter of the character described, comprising a fabric support, a carriage mounted on said fabric support, a casing mounted on said carriage, a guide fixed in said casing, a slide mounted on said guide, a disk cutter adjustably mounted on the slide, spring means for exerting a downward force on said disk cutter, a chain drive mounted in said casing, means carried by the chain for engaging the slide to move the latter back and forth along the casing as the chain is operated, means for shifting the carriage to set the disk cutting member after each cutting stroke, and means for alternately setting the means for shifting the carriage and the means for operating the chain in motion.

7. A fabric cutter of the character described comprising a fabric support, a carriage mounted on said fabric support, a casing extending diagonally across the table fixed to said carriage, a guide extending longitudinally along said casing, a slide movably mounted on said guide, a cutting member adjustably mounted on the slide, a flexible belt member mounted in the casing parallel to said guide, a link fixed to said belt member slidably connected to said slide to operate the latter upon the operation of the belt member, a train of gears for operating said belt member, means for shifting the carriage relative to the fabric support, and means for alternately setting the train of gears for operating the belt member and the means for shifting the carriage in motion.

WILLIAM R. BARRETT.